Patented Aug. 28, 1951

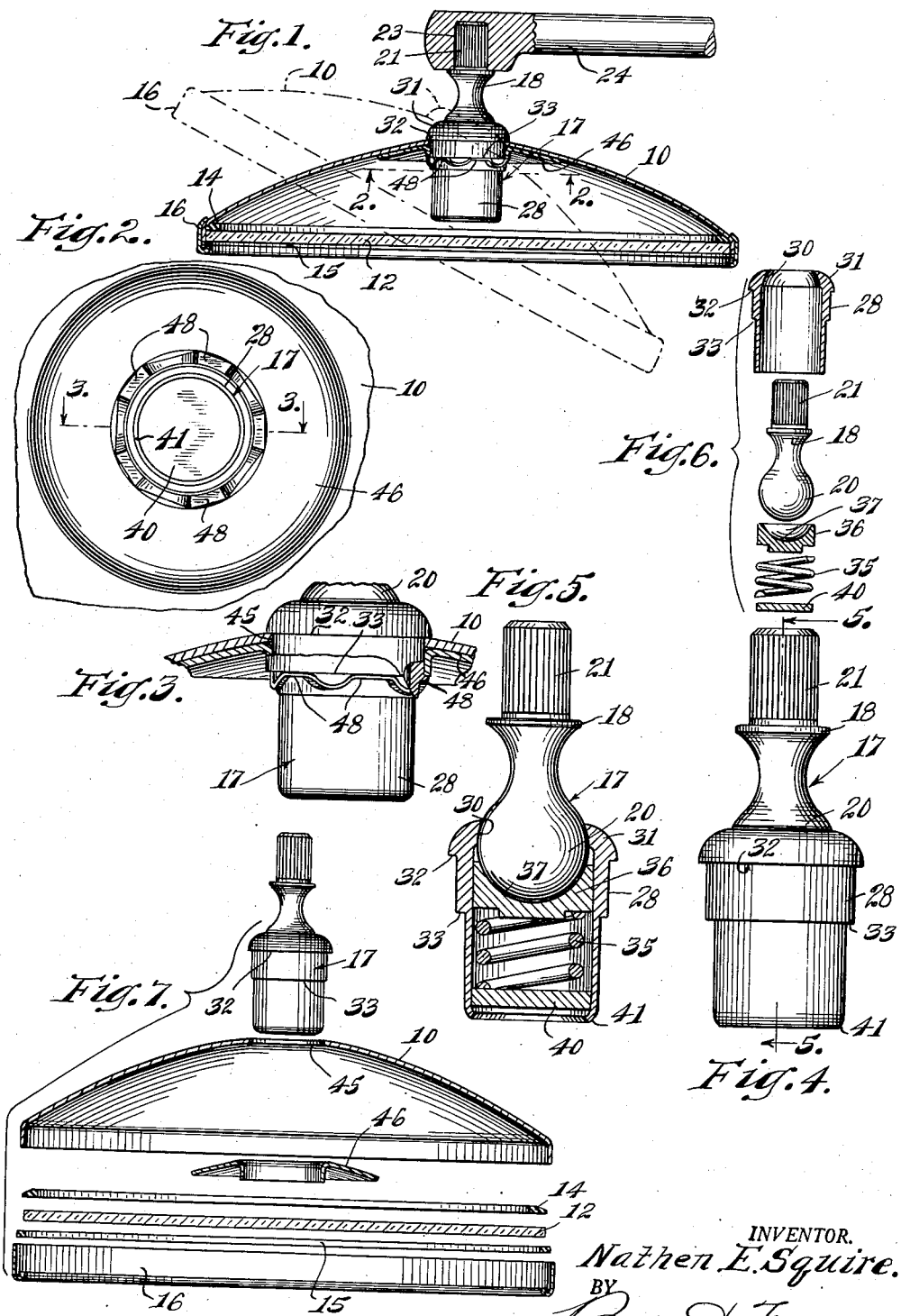

2,566,042

UNITED STATES PATENT OFFICE 2,566,042

BALL AND SOCKET MOUNTING FOR REAR-VIEW MIRRORS AND THE LIKE

Nathen E. Squire, Chicago, Ill., assignor to American Automatic Devices Co., Chicago, Ill., a corporation of Illinois Application June 25, 1947, Serial No. 756,854

2 Claims. (Cl. 287—21)

1

The present invention relates to a novel and improved form of ball and socket mounting, especially adapted for adjustably supporting a device with respect to a fixed support. By way of example, and not limitation, the novel mounting of the present invention may be used in connection with a rear view mirror for mounting it on a supporting arm or bracket.

More particularly, the ball and socket mounting is of the type utilizing spring pressure for firmly securing the device, with which it is associated, in a desired angular position of adjustment, without requiring the use of auxiliary clamping elements for maintaining the device in an adjusted position.

One of the objects of the present invention is to provide an improved unitary ball and socket mounting of the character indicated which may be quickly and easily attached permanently to a device, such as a casing of a rear view mirror.

Another object is to provide an improved unitary ball and socket mounting which is composed of relatively few, simple parts, which may be quickly and easily assembled, and which is capable of being very economically manufactured.

A further object resides in the provision of a novel and improved ball and socket mounting, together with novel means for rigidly and permanently attaching said mounting to a device, such as the casing of a rear view mirror.

Other objects and advantages of this invention will be apparent from the following description, taken in connection with the accompanying drawing in which:

Figure 1 is an axial sectional view through a rear view mirror of circular outline, and its supporting bracket, together with the novel ball and socket mounting embodying the present invention;

Figure 2 is an enlarged fragmentary view, taken as indicated at lines 2—2 on Figure 1;

Figure 3 is an enlarged fragmentary view, part in section and part in elevation, taken substantially as indicated at lines 3—3 on Figure 2;

Figure 4 is an enlarged, elevational view of the unitary ball and socket mounting embodying the present invention;

Figure 5 is an axial section through the ball and socket mounting, taken substantially as indicated at lines 5—5 on Figure 4;

Figure 6 is an exploded view of the various parts of the mounting, prior to assembly; and, Figure 7 is an exploded view of a rear view mirror assembly, together with the novel mounting of the present invention.

2

For convenience, the present invention is illustrated in connection with a rear view mirror assembly which comprises a forwardly dished casing member 10, formed as a sheet metal stamping, shaped for the reception of a mirror 12. The mirror is mounted in position, in the forward end of the casing, with gasket members 14 and 15 at opposite faces thereof at the outer marginal edge of the mirror. The mirror, with the gaskets in position, is firmly mounted in the casing by means of a bezel ring 16, in a manner well understood in the art.

The novel mounting for supporting the mirror in a desired position, is indicated generally at 17, and comprises a stud 18, one end of which is formed with a ball or rounded head 20, and the opposite terminal end being splined, as indicated at 21, for a pressed fit into an opening 23, formed in a supporting arm or bracket 24. Said mounting also includes a tubular body 28, one end of which is formed with an internal annular socket 30, constituting a seat for the rounded head 20 of the stud 18. The external part of the body at said socket end is rounded as indicated at 31, and said body is provided with a pair of stepped, axially spaced apart annular shoulders 32 and 33. When the stud is positioned within the body, with its rounded head 20 seated in the socket, it is yieldingly maintained in relatively firm frictional contact therewith, by means of a relatively heavy coil spring 35. A cup shaped member 36 is adapted to be engaged by the inner end of the spring, and the opposite face of said member is concave as indicated at 37, to constitute a seat for the extreme end portion of the rounded head 20 of the stud. When the stud is mounted within the body with its head seated in its socket, and the spring and the cup washer positioned within the body, the spring is compressed, and a plug 40 is placed against the outer end of the spring, and the outer end of the tubular body 28, is spun inwardly over said plug, as indicated at 41, in Figure 5 of the drawing, for maintaining the parts in assembled relation. It is to be understood that if desired, the cup shaped washer 36 may be omitted and the spring 35 formed for properly cooperating directly with the end of the rounded head 20 of the stud.

The dished casing member 10 of mirror assembly is provided with a central aperture 45, of a size to accommodate snugly therein the portion of the body intermediate the shoulders 32 and 33, so that the shoulder 32, abuts against the outer surface of the casing member. When the mounting 17 is inserted in the aperture of the casing member, an annular collared disc 46 is positioned over the inner end of the body of the mounting, in surrounding relation to the portion of the body intermediate shoulders 32 and 33, and is shaped to fit the contour of the casing 10, as clearly seen in Figure 3 of the drawings. The mounting 17, together with the disc 46, are firmly and permanently attached to the casing 10, by compressing portions of the shoulder 33 to displace the metal laterally against the outer end of the collar of the disc 46, in a manner known as "staking," as clearly indicated at 48 in the drawing. If desired, the disc 46 may be omitted and shoulder 33 of the body of the mounting positioned in proper relation to the shoulder 32, so that the former shoulder may be staked directly against the inner surface of the casing member 10, or if desired, the dished casing member 10, may be provided with an internal annular collar or flange surrounding the opening 45, against the end of which the shoulder 33 may be staked for securing the parts in assembled relation. It is preferred, however, to utilize the annular collared disc 46, for both stability of supporting the mounting 17, and for reinforcement of its connection to the casing member 10.

Although I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. In combination, a dish shaped casing having an aperture therein, and a unitary, friction type, ball and socket mounting having a generally cylindrical, metallic body provided with two axially spaced apart stepped shoulders, said body being snugly insertable in said opening with one shoulder abutting the surface surrounding the opening, the other shoulder projecting beyond the opposite surface of the casing and upset to displace portions of the metal thereof in lateral direction for rigidly and permanently connecting said mounting to the casing.

2. In combination, a dish shaped casing having a central aperture therein, a unitary, friction type ball and socket mounting having a generally cylindrical metallic body provided with two axially spaced apart stepped shoulders, said body being insertable in said opening with the portion intermediate said shoulders snugly fitting the opening and one of the shoulders abutting the convex surface of the casing, and an internally collared washer, snugly fitted on said intermediate portion of the body, beyond the other shoulder, whereby said other shoulder is adapted to be upset for displacing metal thereof against the end face of the collar of said washer for rigidly and permanently connecting said mounting to the casing.

NATHEN E. SQUIRE.

REFERENCES CITED

The following references are of record in the file of this patent:

UNITED STATES PATENTS

| Number | Name | Date |
|---|---|---|
| 394,680 | Dawes | Dec. 18, 1888 |
| 554,949 | Nikoloff | Feb. 18, 1896 |
| 1,252,684 | Godley | Jan. 8, 1918 |
| 1,992,828 | Hodny et al. | Feb. 26, 1935 |
| 2,041,847 | Marchand | May 26, 1936 |
| 2,073,089 | Autenrieth | Mar. 9, 1937 |
| 2,161,433 | Ritz-Woller | June 6, 1939 |